(12) United States Patent
Galarneau et al.

(10) Patent No.: US 8,170,382 B2
(45) Date of Patent: May 1, 2012

(54) FIBER-OPTIC TEMPERATURE SENSOR ASSEMBLY

(75) Inventors: Pierre Galarneau, Québec (CA); Marc Levesque, Saint-Augustin-de-Desmaures (CA); André Fougères, Québec (CA); Bruno Labranche, Québec (CA)

(73) Assignee: Institut National d'Optique

( * ) Notice: Subject to any disclaimer, the term of this patent is extended or adjusted under 35 U.S.C. 154(b) by 350 days.

(21) Appl. No.: 12/498,708

(22) Filed: Jul. 7, 2009

(65) Prior Publication Data

US 2011/0007997 A1 Jan. 13, 2011

(51) Int. Cl.
*G02B 6/00* (2006.01)

(52) U.S. Cl. .......................................... 385/12

(58) Field of Classification Search .............. 385/12, 385/13
See application file for complete search history.

(56) References Cited

U.S. PATENT DOCUMENTS

| | | | |
|---|---|---|---|
| 4,523,092 A | 6/1985 | Nelson | |
| 4,703,174 A | 10/1987 | Anderson et al. | |
| 4,790,669 A | 12/1988 | Christensen | |
| 4,805,985 A * | 2/1989 | Fleck | 385/12 |
| 5,754,717 A * | 5/1998 | Esch | 385/31 |
| 6,539,136 B1 * | 3/2003 | Dianov et al. | 385/12 |
| 2002/0003917 A1 * | 1/2002 | Sherrer et al. | 385/12 |
| 2002/0009252 A1 * | 1/2002 | Maron et al. | 385/12 |
| 2002/0183597 A1 * | 12/2002 | Kaufman et al. | 600/300 |
| 2004/0047536 A1 * | 3/2004 | Pickrell et al. | 385/12 |
| 2005/0094947 A1 * | 5/2005 | James et al. | 385/88 |
| 2006/0115202 A1 * | 6/2006 | Stevens et al. | 385/12 |
| 2007/0110355 A1 * | 5/2007 | Jaaskelainen et al. | 385/12 |

FOREIGN PATENT DOCUMENTS

JP 62-83629 6/1985

* cited by examiner

*Primary Examiner* — Charlie Peng
(74) *Attorney, Agent, or Firm* — Nortin Rose Canada LLP

(57) ABSTRACT

A fiber-optic temperature sensor assembly comprises a cap with an inner cavity. A sensor member is received in the inner cavity of the cap. The sensor member has light-transmitting properties adapted to change with temperature variations. An optical fiber has a first end received in the inner cavity of the cap, and a second end of the optical fiber being adapted to be connected to a processing unit for transmitting light signals between the sensor member and the processing unit. A pressing device is received in the cap and pressing against the sensor member such that the sensor member is in operational contact with the first end of the optical fiber for transmission of light therebetween during operation of the fiber-optic temperature sensor assembly.

11 Claims, 4 Drawing Sheets

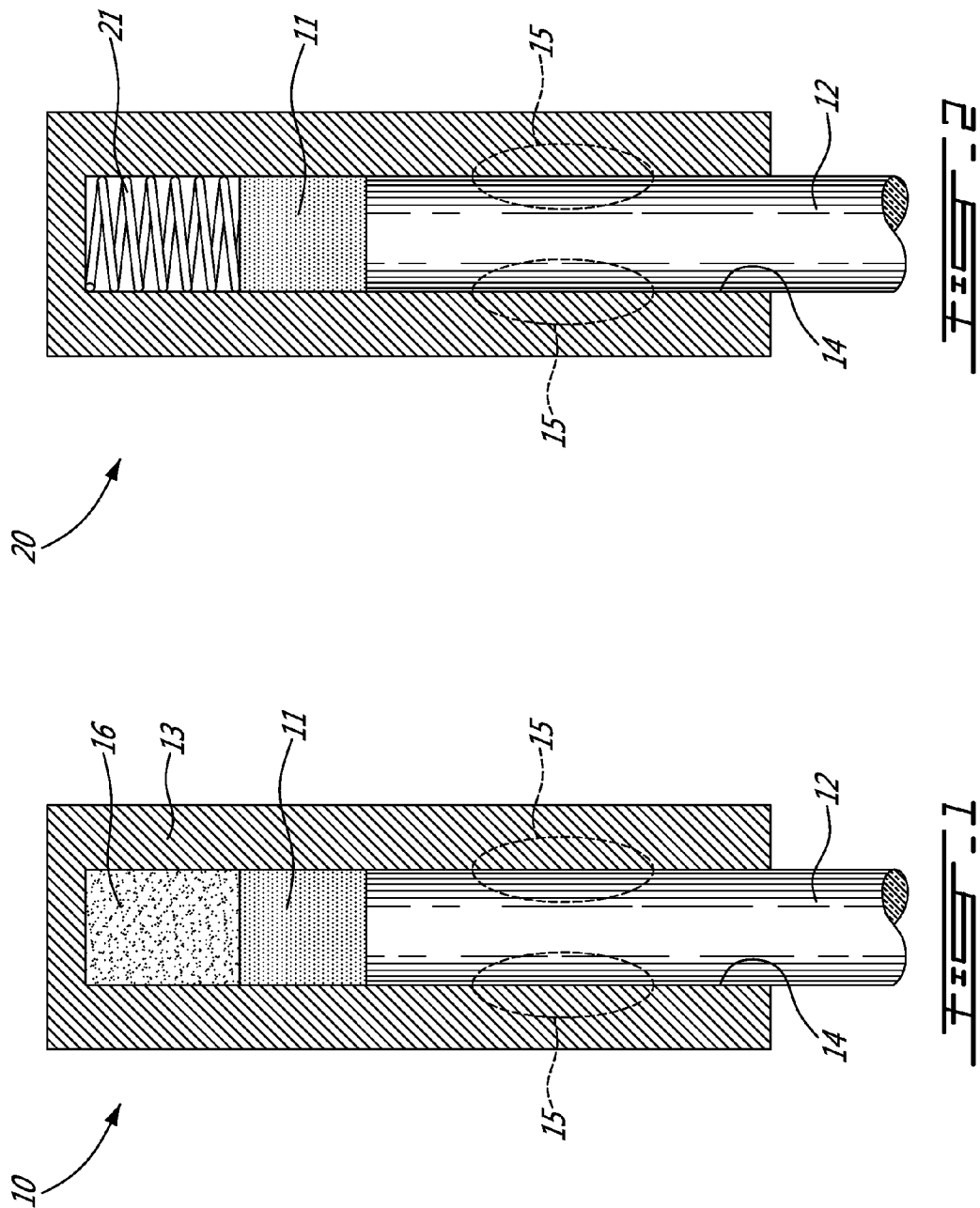

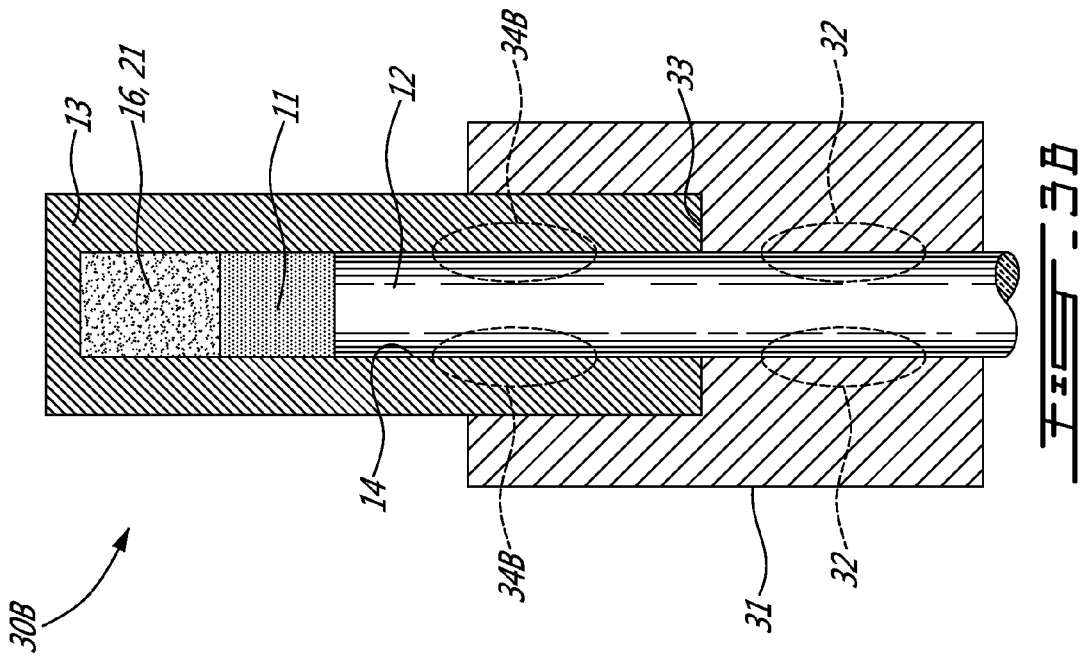
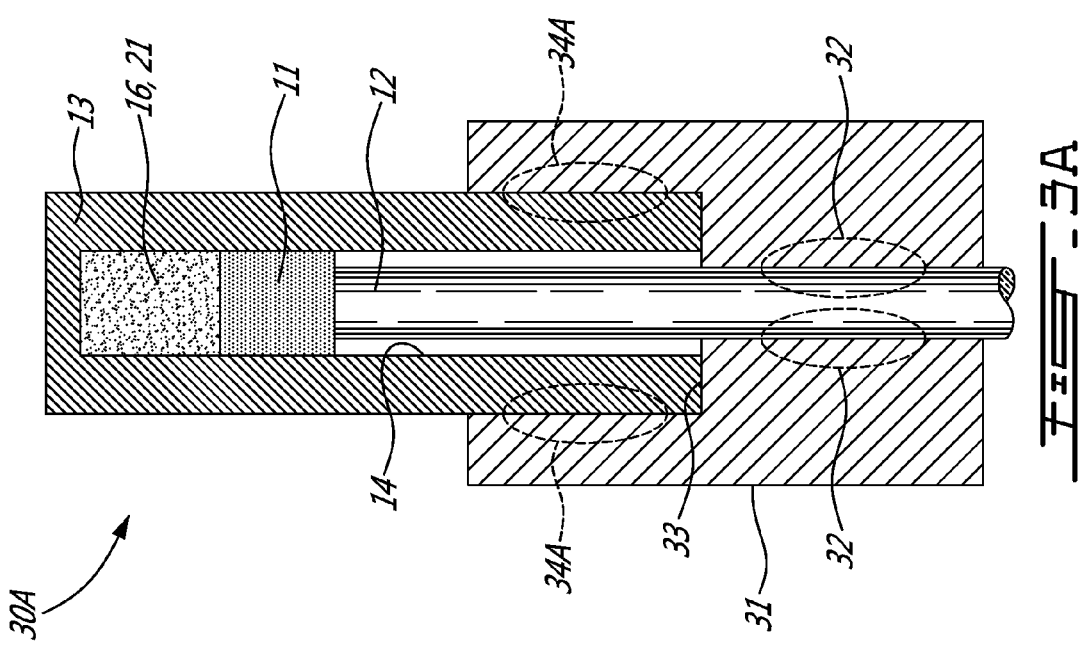

FIBER-OPTIC TEMPERATURE SENSOR ASSEMBLY

FIELD OF THE APPLICATION

The present application relates to temperature sensors, and more particularly to a fiber-optic temperature sensor assembly.

BACKGROUND OF THE ART

Fiber-optic temperature sensors are commonly used in given applications as an advantageous alternative to thermocouples and the like. Fiber-optic temperature sensors are immune to electromagnetic interference (EMI)/radio-frequency interference (RFI). Moreover, fiber-optic temperature sensors are relatively small, and can withstand hazardous environments, including relatively extreme temperatures.

Fiber-optic temperature sensors have an optical fiber extending from a processing unit to the measurement location. A sensor member (e.g., a semiconductor sensor) is provided at an end of the optical fiber. Present fiber-optic temperature sensors use an adhesive to connect the sensor member to the end of the optical fiber.

However, the presence of an adhesive limits the uses of the fiber-optic temperature sensors. For instance, the range of temperature to which the fiber-optic temperature sensor may be exposed is reduced by the reaction of the adhesive to higher temperatures. Also, the strength of the connection between the sensor member and the optical fiber is not optimal. There also have been some shortcomings in uniformly producing fiber-optic temperature sensors of suitable strength at the fiber/sensor member connection. These problems affect the reliability of current fiber-optic temperature sensors. Unreliable temperature sensors are impractical in constraining environments (e.g., nuclear power plants), or concealed systems (e.g., industrial transformers).

SUMMARY OF THE APPLICATION

It is therefore an aim of the present application to provide a fiber-optic temperature sensor assembly that addresses issues associated with the prior art.

Therefore, in accordance with the present application, there is provided a fiber-optic temperature sensor assembly comprising: a cap with an inner cavity; a sensor member received in the inner cavity of the cap, the sensor member having light-transmitting properties adapted to change with temperature variations and light-reflecting properties to reflect transmitted light; an optical fiber having a first end received in the inner cavity of the cap, and a second end of the optical fiber being adapted to be connected to a processing unit for transmitting light signals between the sensor member and the processing unit; and a pressing device received in the cap and pressing against the sensor member such that the sensor member is in operational contact with the first end of the optical fiber for transmission of light therebetween during operation of the fiber-optic temperature sensor assembly.

BRIEF DESCRIPTION OF THE DRAWINGS

FIG. 1 is a schematic view, partly sectioned, of a fiber-optic temperature sensor assembly in accordance with a first embodiment of the present disclosure, with an expansion buffer;

FIG. 2 is a schematic view, partly sectioned, of a fiber-optic temperature sensor assembly in accordance with a second embodiment of the present disclosure, with a biasing device;

FIG. 3A is a schematic view, partly sectioned, of a fiber-optic temperature sensor assembly in accordance with a third embodiment of the present disclosure, with a fused support sleeve;

FIG. 3B is a schematic view, partly sectioned, of a variation of the fiber-optic temperature sensor assembly of FIG. 3A;

DESCRIPTION OF THE PREFERRED EMBODIMENTS

Figure 4:
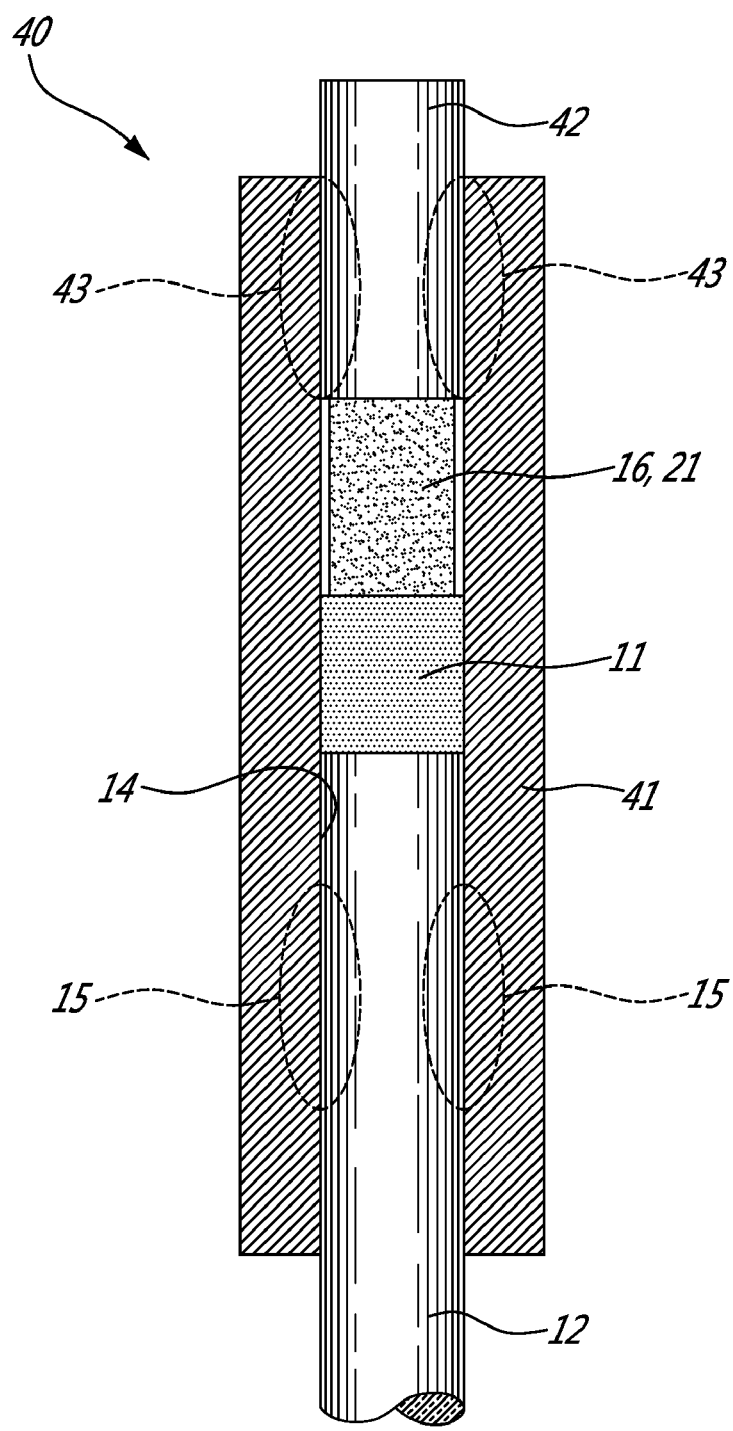
FIG. 4 is a schematic view, partly sectioned, of a fiber-optic temperature sensor assembly in accordance with a fourth embodiment of the present disclosure, with an open-ended cap and plug.

Referring to the drawings and more particularly to FIG. 1, a fiber-optic temperature sensor assembly in accordance with a first embodiment is generally shown at 10. The fiber-optic temperature sensor assembly (hereinafter temperature sensor assembly) is of the type having an optical fiber connected to a processing unit, with a sensor member being provided at the sensor end of the optical fiber, with light signals transmitted between the processing unit and the sensor member through the optical fiber.

The temperature sensor assembly 10 has a sensor member 11 (or set of sensors) contacting an end of an optical fiber 12. The sensor member 11 is made of a semiconductor material or other appropriate material. The sensor member 11 has light-transmitting properties that vary in a known way as a function of the temperature. In an embodiment, the refractive index of the sensor member 11 changes in a calculable manner as a function of temperature variation. Accordingly, the processing unit may determine the temperature by the light signal returning from the sensor member 11. In order for the light to return, the sensor member 11 has light-reflecting properties or, alternatively, a reflective device or surface is provided at the end of the sensor member 11 to cause reflection of light. For instance, the sensor member 11 has a mirror device, a reflective coating or the like. Although not shown, a jacket of protective material (e.g., PTFE) may cover the optical fiber 12. The protective material is selected as a function of the contemplated use of the temperature sensor assembly.

A cap 13 defines an inner cavity 14, in which the sensor member 11 and the end of the optical fiber 12 are accommodated. The cap 13 is made of any suitable material to sustain the high and/or low temperatures to which the temperature sensor assembly 10 (or the temperature sensor assembly of any other embodiment described hereinafter) will be subjected. As an example, the cap 13 is made of glass, so as to be spliced to the optical fiber 12 (i.e., fused, spliced, or connected in any suitable way). As another example, the cap 13 is made of a shape-memory material. In an embodiment shown hereinafter, the shape-memory material is a sleeve having a longitudinal slit by which the sensor member 11 and the optical fiber 12 and a plug or the like are fitted into a central bore. The material then regains its shape to compress the optical fiber 12. One such cap 13 is an Optimend™ mechanical splice (http://www.phasoptx.com/).

In an embodiment, the cap 13 is made of a material similar to that of the optical fiber 12. Accordingly, the optical fiber 12 is spliced to the cap 13, for instance along joint 15, whereby the sensor member 11 is held captive between the end of the optical fiber 12 and the closed end of the cap 13.

In order to maintain the sensor member 11 in contact with the end of the optical fiber 12, a pressing device is used to press the sensor member 11 against the optical fiber 12. In an embodiment, the pressing device is an expansion buffer 16. The expansion buffer 16 is made of a material that is selected to react in a predetermined way when exposed to heat. As the temperature sensor assembly 10 may be subjected to extreme-temperature environments to measure the temperature, the various components of the temperature sensor assembly 10 will thermally expand/contract. The thermal expansion of the expansion buffer 16 is such that, within the range of operation of the temperature sensor assembly 10, the sensor member 11 must always be in contact with the end of the optical fiber 12.

For instance, the thermal expansion/contraction of the various components is in accordance with:

$\Delta L = \Delta L_S + \Delta L_B$, in which $\Delta L$ is the length variation of the cap 13 under thermal expansion/contraction, $\Delta L_S$ is length variation of the sensor member 11 under thermal expansion/contraction, and $\Delta L_B$ is the length variation of the expansion buffer 16 under thermal expansion/contraction. This may require that the expansion buffer 16 contract with a temperature increase.

Referring to FIG. 2, a second embodiment of the temperature sensor assembly is illustrated at 20. The temperature sensor assembly 20 is similar to the temperature sensor assembly 10, whereby like elements will bear like reference numerals. The temperature sensor assembly 20 has a biasing device 21 accommodated in the inner cavity 14 of the cap 13, and positioned between the sensor member 11 and the end of the cap 13. The biasing device 21 may be a coil spring, or any other type of spring and like mechanism, that will press the sensor member 11 against the end of the optical fiber 12. Therefore, despite thermal contraction or expansion of the sensor member 11 and of the cap 13, the sensor member 11 remains in contact with the optical fiber 12 by the biasing action of the biasing device 21.

Referring to FIG. 3A, a third embodiment of the temperature sensor assembly is shown at 30A, and at 30B in FIG. 3B. The temperature sensor assembly 30A/30B is similar to the temperature sensor assembly 10 and the temperature sensor assembly 20, whereby like elements will bear like reference numerals. The temperature sensor assembly 30A has a support sleeve 31 that interconnects the cap 13 to the optical fiber 12. The sleeve 31 defines a throughbore through which the optical fiber 12 passes, with a joint 32 being fused between the optical fiber 12 and the sleeve 31.

A counterbore 33 is provided in the end of the support sleeve 31 opposite the cap 13, such that the end of the cap 13 is accommodated and seated in the counterbore 33. A joint 34A is formed between the outer periphery of the cap 13 and an inner surface of the counterbore 33. Accordingly, the optical fiber 12, the cap 13 and the support sleeve 31A are made of compatible materials.

In FIG. 3A, the optical fiber 12 has a diameter smaller than that of the inner cavity 13. The difference in diameters may be a result of manufacturing limitations for the cap 13. Accordingly, the embodiment illustrated by the temperature sensor assembly 30A is well suited to interface optical fibers 12 with caps 13 of larger diameters. However, the support sleeve 31 may be used with an assembly of optical fiber 12 and cap 13 having similar diameters, as illustrated in FIG. 3B. In the temperature sensor assembly 30B, a joint 34B may be formed between the optical fiber 12 and the cap 13 instead of/in addition to the joint 34A (FIG. 3A). The temperature sensor assembly 30A/30B may be used with the expansion buffer 16 or with the biasing device 21.

Referring to FIG. 4, a fourth embodiment of the temperature sensor assembly is depicted at 40. The temperature sensor assembly 40 is similar to the temperature sensor assembly 10, the temperature sensor assembly 20, and the temperature sensor assembly 30A/30B, whereby like elements will bear like reference numerals. The temperature sensor assembly 40 features an open-ended cap 41, as an alternative to the closed-end cap 13 of the temperature sensor assembly 10 of FIG. 1. The open-ended cap 41 accommodates the sensor member 11, the optical fiber 12, and the expansion buffer 16/the biasing device 21. The open end of the cap 41 is closed by a plug 42. The plug 42 is typically spliced to the cap 41 as shown by joint 43, whereby the cap 41 and the plug 42 are made of compatible materials. The cap 41 is generally easier to manufacture than the cap 13, especially when used with optical fibers 12 of smaller diameters. Alternatively, the open-ended cap 41 is made of a shape-memory material, whereby the sections 15 and 43 are sections at which the cap 41 presses against the optical fiber 12 and plug 42, to hold the sensor member 11 and the member 16/21 captive. Accordingly, the optical fiber 12 and the plug 42 have a diameter greater than that of the member 16/21.

Figure 5:
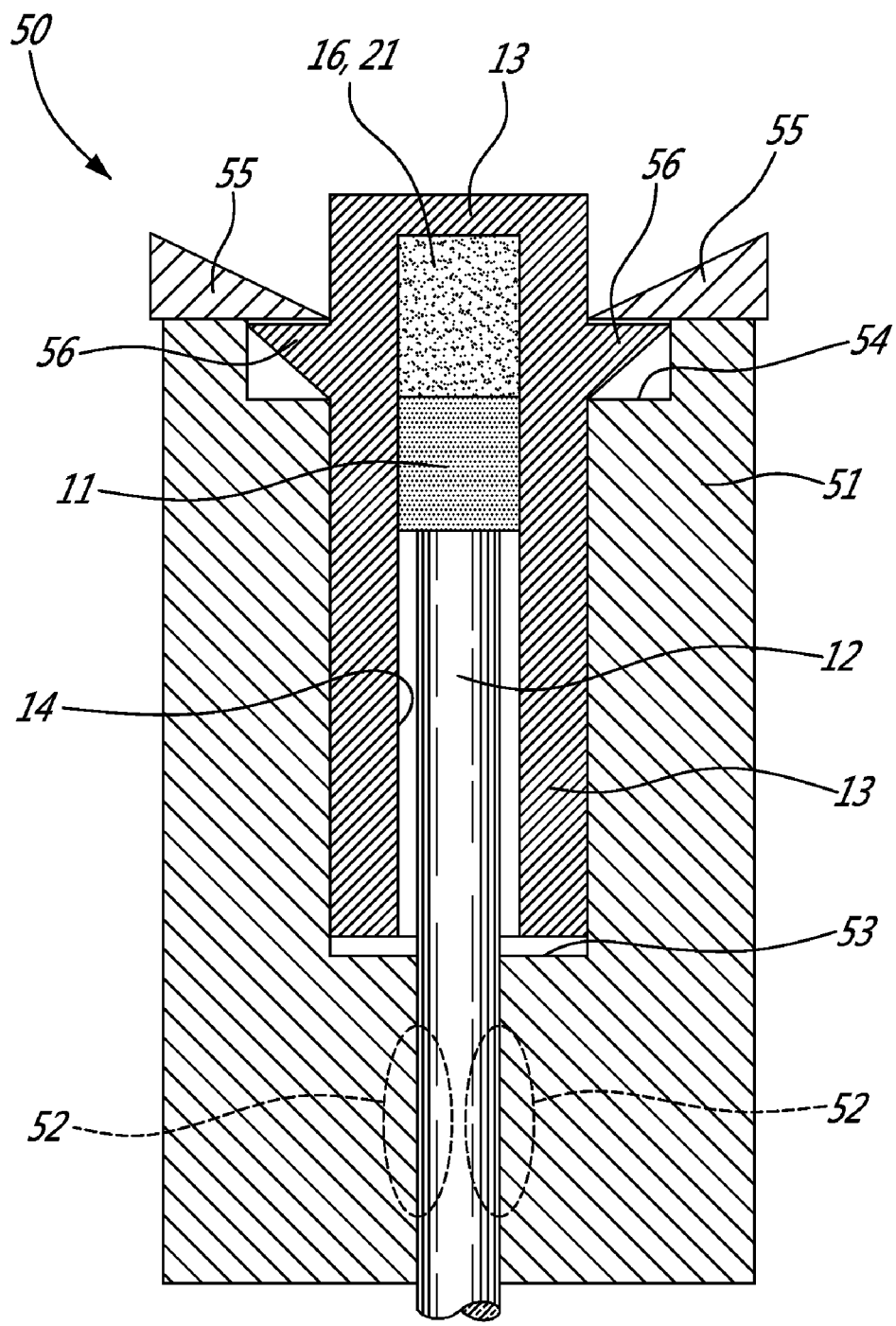
FIG. 5 is a schematic view, partly sectioned, of a fiber-optic temperature sensor assembly in accordance with a fifth embodiment of the present disclosure, with a retaining support sleeve.

Referring to FIG. 5, a fifth embodiment of the temperature sensor assembly is illustrated at 50. The temperature sensor assembly 50 has a sleeve 51 that holds the cap 13 captive, with the sensor member 11 in contact with the optical fiber 12. The sleeve 51 has a throughbore through which the optical fiber 12 passes, and at which the optical fiber 12 is spliced to the sleeve 51, as depicted by joint 52. A first counterbore 53 is defined at an end of the sleeve 51. As the first counterbore 53 matingly receives the cap 13, the inner diameter of the first counterbore 53 and the outer diameter of the cap 13 are generally similar.

A second counterbore 54 is defined adjacent to the first counterbore 53, and has a greater diameter. A ring 55 covers a portion of the second counterbore 54. The cap 13 has a flange 56 projects radially therefrom. The ring 55 holds the cap 13 captive, by a cooperation with the flange 56. The flange 56 is accommodated in the second counterbore 54 of the sleeve 51. The ring 55 and the flange 56 have ramp surfaces, to facilitate the connection of the cap 13 with the support sleeve 51.

It is pointed out that the optical fiber 12 is referred to throughout the description as a single optical fiber. However, the optical fiber 12 may be a plurality of optical-fiber sections spliced together. Any suitable process may be used to fuse the components together (e.g., arc fusion splicing, laser splicing, or the like).

The invention claimed is:

1. A fiber-optic temperature sensor assembly comprising:
   a cap with an inner cavity;
   a sensor member received in the inner cavity of the cap, the sensor member having light-transmitting properties adapted to change with temperature variations and light-reflecting properties to reflect transmitted light;
   an optical fiber having a first end received in the inner cavity of the cap, and a second end of the optical fiber being adapted to be connected to a processing unit for transmitting light signals between the sensor member and the processing unit;
   and a biasing device received in the cap and pressing against the sensor member such that the sensor member is in operational contact with the first end of the optical fiber for transmission of light therebetween during operation of the fiber-optic temperature sensor assembly.

2. The fiber-optic temperature sensor assembly according to claim 1, wherein the biasing device is a coil spring.

3. The fiber-optic temperature sensor assembly according to claim 1, wherein the biasing device is a buffer made of a material expanding/contracting with temperature variations in a predetermined way such that the buffer presses the sensor member against the first end of the optical fiber when a temperature measured is within a range of operation of the fiber-optic temperature sensor assembly.

4. The fiber-optic temperature sensor assembly according to claim 1, wherein the cap is spliced to the optical fiber.

5. The fiber-optic temperature sensor assembly according to claim 1, wherein the cap is an open-ended cap, and further comprising a plug at the open end of the cap, whereby the sensor member and the biasing device are held captive in the inner cavity of the cap between the plug and the optical fiber.

6. The fiber-optic temperature sensor assembly according to claim 5, wherein the plug is spliced to the cap.

7. The fiber-optic temperature sensor assembly according to claim 5, wherein the open-ended cap is made of a shape-memory material having a longitudinal bore accessed by a closeable radial slit, the plug and the optical fiber being held captive by pressure of the open-ended cap.

8. The fiber-optic temperature sensor assembly according to claim 1, further comprising a support sleeve connecting the cap to the optical fiber, the support sleeve defining a throughbore for the optical fiber, the support sleeve being spliced to the optical fiber about the throughbore, the support sleeve further comprising a first counterbore for receiving a portion of the cap.

9. The fiber-optic temperature sensor assembly according to claim 8, wherein the cap is spliced to the support sleeve about the first counterbore.

10. The fiber-optic temperature sensor assembly according to claim 8, further comprising means to hold the cap captive in the support sleeve.

11. The fiber-optic temperature sensor assembly according to claim 10, wherein the support sleeve comprises a second counterbore, and said means is a ring covering the second counterbore, the cap having a flange cooperating with the ring such that the flange is held captive in the second counterbore.

* * * * *